Jan. 6, 1953 — L. M. GREENE — 2,624,529
AIRPLANE INSTRUMENT
Filed April 28, 1951 — 2 SHEETS—SHEET 1
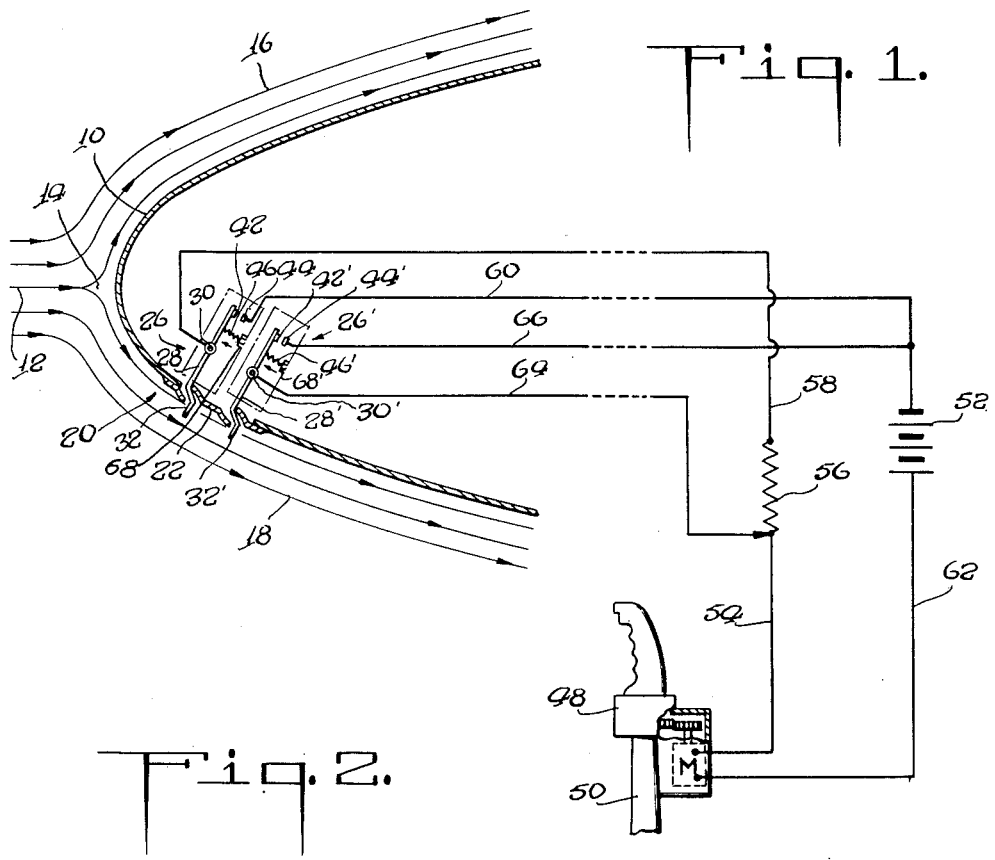
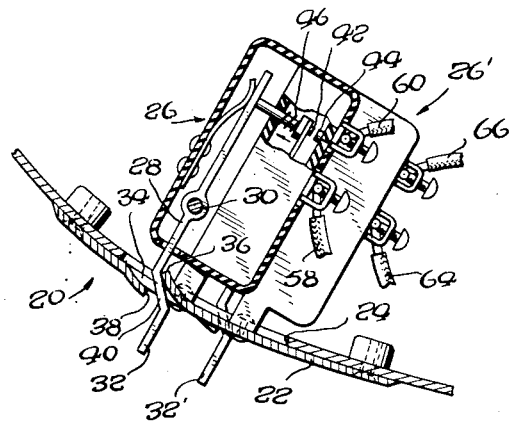
INVENTOR.
LEONARD M. GREENE
ATTORNEY

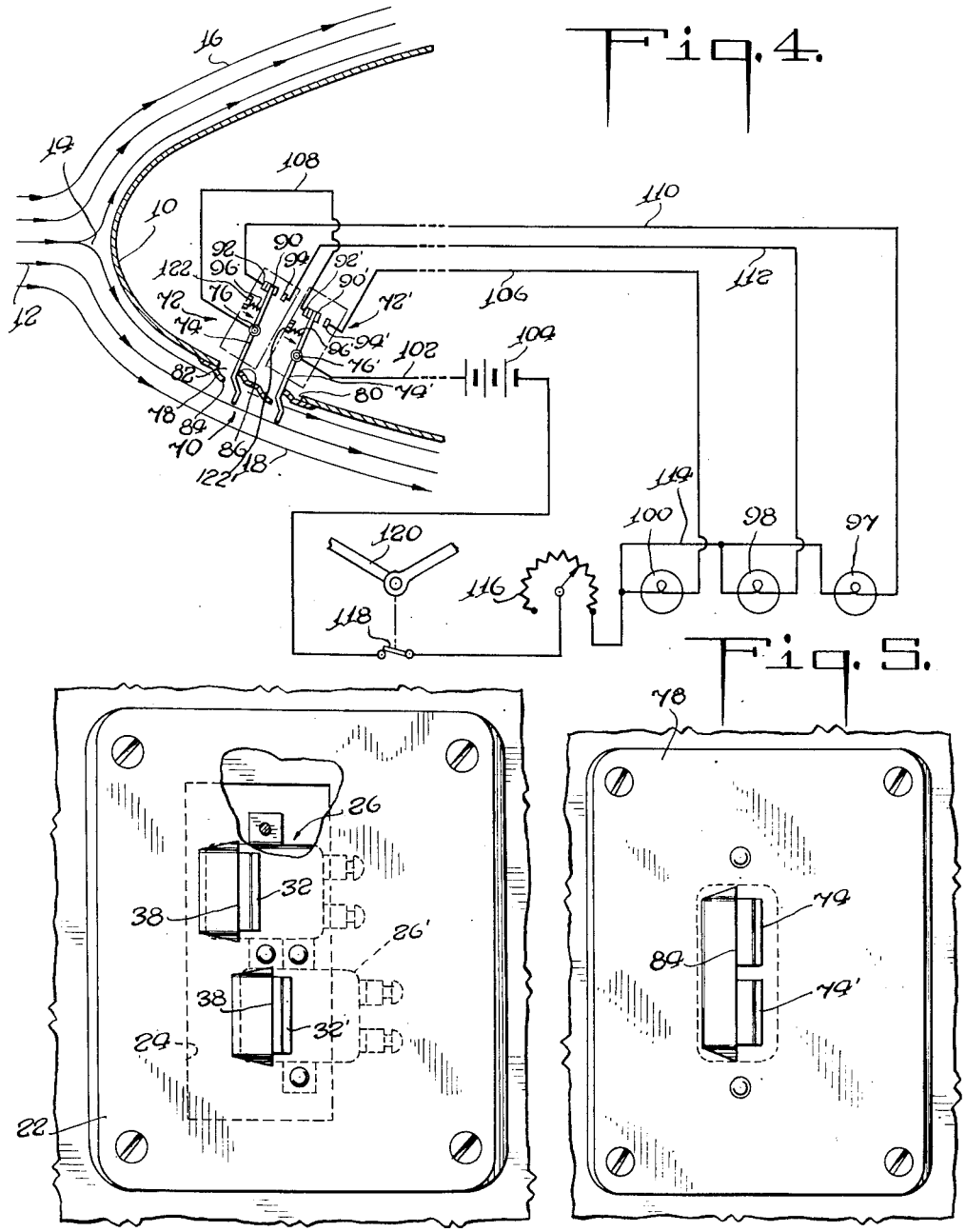

Patented Jan. 6, 1953

2,624,529

UNITED STATES PATENT OFFICE 2,624,529

AIRPLANE INSTRUMENT

Leonard M. Greene, Scarsdale, N. Y.

Application April 28, 1951, Serial No. 223,595

20 Claims. (Cl. 244—1)

This invention relates to airplane instruments.

It is an object of my invention to provide an airplane instrument for aiding a pilot in maintaining an airplane at a predetermined angle of attack.

It is another object of my invention to provide an instrument of the character described having signalling devices which closely bracket a predetermined angle of attack.

It is a further object of my invention to provide an instrument of the character described which will enable a pilot to fly an airplane at an attitude substantially corresponding to maximum lift, but not dangerously close to stall, whereby to assist during take-off or landing when it is particularly desirable for the wings to furnish maximum lift.

It is an additional object of my invention to provide an instrument of the character described which is positive, reliable and efficient in operation and, withal, constitutes relatively few, simple and sturdy parts.

It is yet another object of my invention to provide an instrument of the character described which can be installed quickly and easily on airplanes.

Other objects of my invention will in part be obvious and in part will be pointed out hereinafter.

My invention accordingly consists in the features of construction, combinations of elements and arrangements of parts which will be exemplified in the instruments hereinafter described and of which the scope of application will be indicated in the appended claims.

In the accompanying drawings in which are shown several of the various possible embodiments of my invention, Fig. 1 is a schematic circuit diagram of an airplane instrument constructed in accordance with the present invention and mounted on the nose of an airfoil, said instrument being drawn to an oversized proportionate scale for the purpose of illustration;

Fig. 2 is a cross-sectional, uniformly scaled, enlarged view through a fragment of the skin of the airfoil and one of the sensing units of which the instrument is comprised;

Fig. 3 is a front view of the instrument;

Fig. 4 is a view similar to Fig. 1 of an instrument embodying a modified form of my invention; and Fig. 5 is a view similar to Fig. 3 embodying another modified form of my invention.

In general, I achieve the various objects of my invention by mounting on an airfoil two sensing units of a type responsive to the passage of the separation point over a preselected point on the nose of the airfoil as the angle of attack varies. Essentially, such a sensing unit includes a sensing vane extending from the nose of the airfoil into the airstream and movable fore and aft between two extreme positions by virtue of a change in position of the separation point. Sensing units embodying the foregoing characteristics basically operate in accordance with either one of two general principles; either the vane is biased to its aft extreme position and is actuated by being flipped to its fore extreme position upon passage of the separation point over the vane, as is specifically shown, for instance, in my United States Letters Patent No. 2,478,967, issued August 16, 1949, for Stall Warning Device for Airplanes; or the vane is biased to its fore extreme position and is held in its aft extreme position by air pressure during flight up to the time that the separation point approaches the vane, the pressure holding the vane in such position thereupon diminishing sufficiently to permit the biasing means to actuate the vane by flipping it to its fore extreme position. The second type of sensing unit is specifically shown, for instance, in my application Serial No. 223,596 filed April 28, 1951, for Airplane Stall Warning Device. In both units the vane controls a switch so that, either upon passage of the separation point over the vane in the first type of unit or upon approach of the separation point to the vane in the second type of unit, actuation of the vane operates the switch and energizes a signal.

In accordance with the present invention two sensing units of the character described are so positioned on the airfoil that they will energize signals at slightly different positions of the separation point, i. e., when the airfoil is at slightly different angles of attack with respect to a local air mass. By so controlling the airplane that one unit is actuated but not the other, the airplane will be maintained between two predetermined angles of attack whose values differ only slightly.

Referring now in detail to the drawings, and more particularly to Figs. 1–3, the reference numeral 10 denotes the nose of a conventional chord-section of a standard airfoil. The lines 12 indicate the direction of flow of a local air mass. Said mass divides at a separation point 14 to form a stream 16 flowing above the wing, and another stream 18 flowing beneath the wing.

Pursuant to my invention I provide an instrument 20 whose various components seen in Fig. 1 are shown to a disproportionate scale to expedite understanding, the actual sizes of the components being small in comparison to an airfoil. Said instrument includes a mounting plate 22 which is snugly secured over an opening 24 in the nose of the airfoil, the plate being suitably shaped to conform to the contour of the airfoil in its vicinity.

The plate carries a sensing unit 26 including a sensing vane 28 oscillatable on a pivot 30 extending parallel to the span of the airfoil. A tip 32 of the vane extends through an opening 34 in the mounting plate whereby to project into the airstream. The rear edge 36 of the opening acts as an aft stop for the vane 28, and the front edge 38 of the opening as a fore stop.

In order to minimize the area of this opening presented to the airstream the aft edge 36 is offset inwardly of the airfoil, the fore edge 38 is offset outwardly, and the vane is formed with an offset 40 extending transversely of the length of the vane through the space between the aft and fore edges.

The sensing unit 26 further includes a single-pole, single-throw switch comprising a movable contact 42 and a stationary contact 44. The movable contact is controlled by the sensing vane 28. A spring 46, e. g., a compression spring (the biasing direction of all springs is indicated by an arrow alongside each spring) biases the vane against the aft stop and the movable contact 42 to open position so that normally the two switch contacts are spaced apart.

The instrument 20 also has a second sensing unit 26' carried by the plate. The second unit 26' is identical to first unit 26 and the parts of the second unit, therefore, have been denoted by the same reference numerals with a prime added for the purpose of distinction.

The tip of the sensing vane 28 is located at some predetermined point on the nose of the airfoil (wing) and the tip of the sensing vane 28' is located slightly aft thereof. Therefore, if during flight the airplane is so controlled as to cause the separation point just to pass over the tip of the vane 28 by an amount only sufficient to flip the vane from its aft stop to its fore stop, the vane 28' will remain against its aft stop, so that the contacts 42, 44 will be closed, but the contacts 42', 44' will remain open. This assumes that the two units 26, 26' are identical in all respects, including the size and weight of the vanes and the biasing force of the springs.

In the preferred form of my invention the vane 28' is so located that the same is actuated by passage thereover of the separation point at an attitude of imminent stall; that is to say, when the contacts 42', 44' are closed the airplane is near to stall and the angle of attack of the wings should be lowered or other remedial action taken. The vane 28 is slightly fore of the vane 28' so that when it is actuated by passage of the separation point the aircraft is in an attitude of high angle of attack which, however, is not dangerously close to stall. Accordingly, if the pilot controls the airplane to maintain the vane 28 actuated by passage thereover of the separation point, but to keep the vane 28' from being actuated by the same cause, the airplane will be at a maximum safe angle of attack and thus maximum safe lift will be attained.

Means is included to signal the condition of the vanes 28, 28' to the pilot. In the embodiment of my invention shown in Fig. 1, the signalling means is of a tactile nature consisting of a stick shaker 48 constructed, for example, as shown in my application for United States Letters Patent, Ser. No. 122,623, filed October 21, 1949, for Vibratory Aircraft Alarms of the Rotary Eccentric Weight Type. Said shaker includes an electric motor 48 arranged to rotate an eccentric weight about a control stick 50. The motor is energized from a battery 52.

The circuit for energizing the motor includes a lead line 54 running from one motor terminal to one end of a resistance 56. The other end of the resistance is connected by a lead line 58 to the movable contact 42 controlled by the vane 28. From the stationary contact 44 a lead line 60 extends to a terminal of the battery 52. The circuit is completed by a lead line 62 running from the other terminal of the battery to the other terminal of the motor.

It will be appreciated that when the contacts 42, 44 of the sensing unit 26 are closed the motor will be energized to shake the stick. Due to the resistance 56 only a mild or weak degree of shaking will be felt by the pilot.

The circuit for energizing the motor 48 further includes a lead line 64 running from the movable contact 42' of the sensing unit 26' to the lead line 54. Another lead line 66 extends from the stationary contact 44' to the lead line 60. Accordingly, closure of the contacts 42', 44' will energize the motor 48 from the battery 52 without the resistance 56 so that in effect said resistance is shunted by a path of low resistance. Thus, when the vane 28' is actuated the control stick will be shaken more violently than when only the vane 28 is actuated.

With the instrument 20 in operation a pilot who wishes to obtain maximum lift will manipulate the control stick to bring up the nose of the airplane until a mild shaking is felt, and the airplane is maintained at this attitude. If the shaking becomes too violent the pilot recognizes that a condition of imminent stall has been reached and will take the appropriate corrective action to restore the mild shaking of the stick and keep the airplane at maximum lift. This mode of operation is particularly useful during landings and take-offs.

By way of example, highly satisfactory results are obtained where the two sensing vanes are spaced one-half inch apart on the skin of the airfoil, the sensing units being otherwise identical and identically biased. Under this arrangement, with proper observance of the signals, the airplane will be maintained with the separation point fluctuating less than one-half inch and within one-half inch of the position of the separation point corresponding to incipient stall.

If desired, the fore and aft spacing between the two sensing vanes can be varied without varying the positions of the separation point at which the vanes are actuated. This can be accomplished, for example, by varying the biasing forces of the springs 46, 46'. Conversely, without changing the fore and aft spacing between the two vanes a wider margin may be afforded between the two points of actuation by varying the biasing forces of said springs by changing the setting of adjustable nuts 68, 68'. It also will be observed that it is not necessary to have the two sensing units 26, 26' close to one another. They can be separated spanwise of the wings. Nevertheless, I prefer to have the two units quite close together spanwise, but not in the same chord-section, as indicated in Fig.

3, in order that the two units may form part of a single sensing assembly and the influence of variable conditions may be eliminated.

In Fig. 4 I have shown another maximum lift indicator 70 embodying a modified form of my invention. Said indicator includes two sensing units 72, 72' of identical construction whose parts will be indicated by the same reference numerals, except that those of the unit 72' will be distinguished by primes. The unit 72 has a sensing vane 74 oscillatable at a pivot 76 parallel to the span of the wings. Said unit is carried by a mounting plate 78 covering an aperture 80 in the airfoil. The mounting plate is formed with an opening 82, one edge 84 of which constitutes a fore stop for the vane 74, and the other edge 86 an aft stop.

The unit 72 includes a switch of the single-pole, double-throw type constituting a movable contact 90 controlled by the vane 74, a first stationary contact 92 and a second stationary contact 94. The vane is biased by a spring 96 against its fore stop. In this position the movable contact 90 engages the second stationary contact 94, the same comprising what will be referred to as the "closed" position of the switch. The other position of the switch, to wit, when the vane abuts the aft stop and the movable contact engages the first stationary contact 92, is known as the "open" position of the switch.

The units 72, 72' operate a visual signalling device including three lamps 97, 98, 100 which, if desired, may be of different colors; for example, the lamp 97 may be yellow, the lamp 98 green, and the lamp 100 red.

The circuit connecting the sensing units 72, 72' to the signalling device includes a lead line 102 connecting one terminal of a battery 104 to the movable contact 90' of the unit 72'. A lead line 106 runs from the second stationary contact 94' to one terminal of the lamp 100. Another lead line 108 runs from the first stationary contact 92' to the movable contact 90 of the sensing unit 72. A lead line 110 connects the first stationary contact 92 to one terminal of the lamp 97 and a corresponding lead line 112 connects the second stationary contact 94 to one terminal of the lamp 98. All the remaining terminals of the lamps 97, 98, 100 are connected by a lead line 114 through a variable resistor 116 and a switch 118 to the other terminal of the battery 104.

The switch 118 is controlled by an airborne-sensing mechanism 120 in such fashion that when the airplane is airborne the switch 118 is closed and when the airplane is on the ground the switch is open. A typical airborne-sensing mechanism is a landing gear torque knee which yields under the weight of the airplane when on the ground.

The sensing units 72, 72' will have their vanes actuated upon the approach of the separation point to the vanes from their fore sides. That is to say, in contrast to the sensing units 26, 26' which are actuated by passage of the separation point therefore, the vanes 74, 74' are actuated merely upon approach of the separation point to the same, this action being explained in greater detail in my co-pending application Ser. No. 223,596. The vanes 74, 74' are spaced apart slightly fore and aft, for example, one-half inch so that the vane 74 will be actuated before the vane 74'. Optionally, the spacing between the vanes in a fore and aft direction may be reduced, even to no chordwise spacing at all, as illustrated in Fig. 5, and the vanes may be caused to act in sequence by varying the biasing forces (by changing the setting of adjustable nuts 122, 122') so that the vane 74 will be actuated upon the separation point reaching a position fore of the position required for the separation point to actuate the vane 74'.

During normal flight when the switch 118 is closed because the airplane is airborne, an airplane with the indicator 70 will have the lamp 97 illuminated because the separation point will be well fore of the vane 74 so that the contact 90 will be closed against the contact 92. The lamp 98 will not be lit because the contacts, 90, 94 will be spaced. It also should be noted that at this time the contacts 90, 92' are closed, this being necessary to supply power to one or the other of the lamps 97, 98. To attain maximum lift the nose of the airplane is raised until the separation point is moved aft far enough to cause actuation of the vane 74 but not the vane 74'. Actuation of the vane 74 shifts the same against its fore stop. As this occurs, the contacts 90, 92 will open, extinguishing the lamp 97 and immediately thereafter the contacts 90, 94 will close, illuminating the lamp 98. The lamp 100 will remain dark inasmuch as the contact 90' still is spaced from the contact 94'. If the nose should be raised slightly more, the separation point will approach close enough to the vane 74' to actuate the same. Actuation of the vane 74' opens the contacts 90', 92' to extinguish lamp 98 and closes the contacts 90', 94', which will energize the lamp 100. The pilot upon observing the energization of this latter lamp will correct the position of the airplane to prevent stall.

It thus will be seen that there are provided devices which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. In combination, an airfoil having a separation point which shifts over the nose thereof as the angle of attack of the airfoil varies, a first movable vane, a second movable vane, a first switch controlled by the first vane, a second switch controlled by the second vane, said vanes being disposed for actuation by change of pressure consequent upon movement of the separation point, the first vane being disposed for such actuation on the approach of said point to stall conditions and the second vane being disposed for such actuation slightly before the first vane is actuated, whereby when the second switch is actuated and the first switch is unactuated the airfoil will be at a maximum safe angle of attack.

2. In combination, an airfoil having a separation point which shifts over the nose thereof as the angle of attack of the airfoil varies, a first movable vane, a second movable vane, a first switch controlled by the first vane, a second switch controlled by the second vane, said vanes being disposed for actuation by change of pressure consequent upon movement of the separation point, the first vane being disposed for such actuation on the approach of said point to stall conditions and the second vane being disposed for such actuation slightly before the first vane is actuated, and electric signalling means variously actuated upon operation of said switches, whereby when said electric signalling means is actuated by the second switch and unactuated by the first switch, the airfoil will be at a maximum safe angle of attack.

3. In combination, an airfoil having a separation point which shifts over the nose thereof with respect to a limit as the angle of attack of the airfoil varies, the approach to said limit substantially coinciding with the approach to stall conditions, a first movable vane located within the range of influence of the shifting separation point and arranged to function on the approach of said point to stall conditions, a second movable vane located within the range of influence of the shifting separation point and arranged to function slightly before the first vane functions, whereby when the second vane is actuated and the first vane is unactuated the airfoil will be at a maximum safe angle of attack.

4. In combination, an airfoil having a separation point which shifts over the nose thereof with respect to a limit as the angle of attack of the airfoil varies, the approach to said limit substantially coinciding with the approach to stall conditions, a first movable vane located within the range of influence of the shifting separation point and arranged to function on the approach of said point to said stall conditions, a second movable vane located within the range of influence of the shifting separation point and arranged to function slightly before the first vane functions, and indicating means variously actuated by said vanes, whereby when said indicating means is actuated by the second vane and is unactuated by the first vane the airfoil will be at a maximum safe angle of attack.

5. In combination, an airfoil having a separation point which shifts over the nose thereof as the angle of attack of the airfoil varies, a first and a second movable vane disposed to be actuated by change of pressure consequent upon movement of said separation point, the first vane being disposed for such actuation on the approach of said point to stall conditions and the second vane being disposed for such actuation when the separation point is in a slightly different position chordwise of the airfoil and in advance of the position of the separation point for actuation of the first vane, whereby as the angle of attack increases first the second and then the first vane will be actuated, a first switch controlled by and actuated upon the actuation of the first vane, a second switch controlled by and actuated upon the actuation of the second vane, a first signalling means energized upon actuation of the first switch, and a second signalling means energized upon actuation of the second switch, whereby when the second signalling means is energized and the first signalling means is unenergized the airfoil will be at a maximum safe angle of attack.

6. In combination, an airfoil having a separation point which shifts over the nose thereof as the angle of attack of the airfoil varies, a first and a second movable vane disposed to be actuated by change of pressure consequent upon movement of said separation point, the first vane being disposed for such actuation on the approach of said point to stall conditions and the second vane being disposed for such actuation when the separation point is in a slightly different position chordwise of the airfoil and in advance of the position of the separation point for actuation of the first vane, whereby as the angle of attack increases first the second and then the first vane will be actuated, a first switch controlled by and actuated upon the actuation of the first vane, a second switch controlled by and actuated upon the actuation of the second vane, a control stick shaker, means for weakly energizing said shaker upon actuation of the second switch, and means for strongly energizing said shaker upon actuation of the first switch, whereby when the shaker weakly is energized the airfoil will be at a maximum safe angle of attack.

7. In combination, an airfoil having a separation point which shifts over the nose thereof as the angle of attack of the airfoil varies, a first and second movable vane disposed to be actuated by change of pressure consequent upon movement of said separation point, the first vane being disposed for such actuation on the approach of said point to stall conditions and the second vane being disposed for such actuation when the separation point is in a slightly different position chordwise of the airfoil and in advance of the position of the separation point for actuation of the first vane, whereby as the angle of attack increases first the second and then the first vane will be actuated, a first switch controlled by and actuated upon the actuation of the first vane, a second switch controlled by and actuated upon the actuation of the second vane, a first lamp, a second lamp, means to energize the first lamp upon actuation of the first switch, and means to energize the second lamp upon actuation of the second switch, whereby when the second lamp is energized and the first lamp is unenergized the airfoil will be at a maximum safe angle of attack.

8. In combination, an airfoil having a separation point which shifts over the nose thereof as the angle of attack of the airfoil varies, a first and a second movable vane disposed to be actuated by change of pressure consequent upon movement of said separation point, the first vane being disposed for such actuation on the approach of said point to stall conditions and the second vane being disposed for such actuation when the separation point is in a slightly different position chordwise of the airfoil and in advance of the position of the separation point for actuation of the first vane, whereby as the angle of attack increases first the second and then the first vane will be actuated, a first switch controlled by and actuated upon the actuation of the first vane, a second switch controlled by and actuated upon the actuation of the second vane, a first lamp, a second lamp, a third lamp, means to energize only the first lamp when both said switches are unactuated, means to energize only the second lamp when the first switch is actuated, and means to energize only the third lamp when the second switch is actuated, whereby when the third lamp is energized and the first and second lamps are unenergized, the airfoil will be at a maximum safe angle of attack.

9. An airplane instrument for installation on a leading edge of an airfoil in a region of influence of the shifting separation point, said instrument including mounting means, and at least a first and a second vane carried by said mounting means for actuation by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, whereby when the second vane is actuated and the first vane is unactuated the airfoil will be at a maximum safe angle of attack.

10. An airplane instrument for installation on a leading edge of an airfoil in a region of influence of the shifting separation point, said instrument including mounting means, at least a first and a second vane carried by said mounting means for actuation by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, a first switch controlled by the first vane and a second switch controlled by the second vane, whereby when the second switch is actuated and the first switch is unactuated the airfoil will be at a maximum safe angle of attack.

11. An airplane instrument for installation on a leading edge of an airfoil in a region of influence of the shifting separation point, said instrument including mounting means, at least a first and a second vane carried by said mounting means for actaution by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, a first switch controlled by the first vane, a second switch controlled by the second vane, and indicating means variously actuated upon operation of said switches, whereby when the indicating means is actuated by the second switch and is unactuated by the first switch the airfoil will be at a maximum safe angle of attack.

12. An airplane instrument for installation on a leading edge of an airfoil in a region of influence of the shifting separation point, said instrument including mounting means, at least a first and a second vane carried by said mounting means for actuation by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, a first switch controlled by the first vane, a second switch controlled by the second vane, a first signalling means associated with and controlled by the first switch, and a second signalling means associated with and controlled by the second switch, whereby when the second signalling means is actuated and the first signalling means is unactuated, the airfoil will be at a maximum safe angle of attack.

13. An airplane instrument for installation on a leading edge of an airfoil in a region of influence of the shifting separation point, said instrument including mounting means, at least a first and second means carried by said mounting means for actuation by change of pressure consequent upon movement of the separation point, the first vane to be disposed for such actuation on the approach of said point to stall conditions and the second vane to be disposed for such actuation when the separation point is in a slightly different position chrodwise of the airfoil and in advance of the position of the separation point for actuation of the first vane so that as the angle of attack of the air-foil increases first the second and then the first vane will be actuated, a first switch controlled by the first vane, a second switch controlled by the second vane, a control stick shaker, means to weakly energize said shaker upon actuation of the second switch, and means for strongly energizing said shaker upon actuation of the first switch, whereby when the shaker is weakly energized the airfoil will be at a maximum safe angle of attack.

14. An airplane instrument for installation on a leading edge of an airfoil in a region of influence of the shifting separation point, said instrument including mounting means, at least a first and a second vane carried by said mounting means for actuation by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, a first switch controlled by the first vane, a second switch controlled by the second vane, a group of at least a first and a second signal lamp, means to energize the first lamp upon actuation of the first switch, and means to energize the second lamp upon actuation of the second switch, whereby when the second signal lamp in energized and the first signal lamp is unenergized the airfoil will be at a maximum safe angle of attack.

15. An airplane instrument for installation on a leading edge of an airfoil in a region of influence of the shifting separation point, said instrument including mounting means, at least a first and a second vane carried by said mounting means for actuation by change of pressure consequent upon movement of the separation point, the first vane to be disposed for such actuation on the approach of said point to stall conditions and the second vane to be disposed for such actuation when the separation point is in a slightly different position chordwise of the airfoil and in advance of the position of the separation point for actuation of the first vane so that as the angle of attack of the airfoil increases first the second and then the first vane will be actuated, a first switch controlled by the first vane, a second switch controlled by the second vane, a first lamp, a second lamp, a third lamp, means to energize only the first lamp when both switches are unactuated, means to energize only the second lamp when the first switch is actuated, and means to energize only the third lamp when the second switch is actuated, whereby when the third lamp is energized and the first and second lamps are unenergized the airfoil will be at a maximum safe angle of attack.

16. In combination, an airfoil having a separation point which shifts over the nose thereof as the angle of attack of the airfoil varies, a first and a second sensing unit each of which is actuated upon the passage of the separation point over a different preselected point on the nose of the airfoil as the angle of attack varies, a first switch controlled by the first unit and a second switch controlled by the second unit, said units being disposed so that the preselected point for the first unit is slightly aft of the preselected point for the second unit, said first unit being so disposed that the preselected point for that unit corresponds to the approach of the separation point to stall conditions, whereby when the second switch is actuated and the first switch is unactuated the airfoil will be at a maximum safe angle of attack.

17. In combination, an airfoil having a separation point which shifts over the nose thereof as the angle of attack of the airfoil varies, a first and a second sensing unit, each of which is actuated upon the passage of the separation point over a different preselected point on the nose of the airfoil as the angle of attack varies, a first switch controlled by the first unit, a second switch controlled by the second unit, said units being disposed so that the preselected point for the first unit is slightly aft of the preselected point for the second unit, said first unit being so disposed that the preselected point for that unit corresponds to the approach of the separation point to stall conditions, and electric signalling means variously actuated upon operation of said switches, whereby when the electric signalling means is actuated by the second switch and is unactuated by the first switch the airfoil will be at a maximum safe angle of attack.

18. An airplane instrument for installation on a leading edge of an airfoil in a region of influence of the shifting separation point, said instrument including mounting means, at least a first and a second sensing unit each of which is actuated upon the passage of the separation point over a different preselected point on the nose of the airfoil as the angle of attack of the airfoil varies, and means to secure said units to said mounting means with the preselected point for the first unit to be slightly aft of the preselected point for the second unit, and with the first unit to be so disposed that the preselected point for that unit corresponds to the approach of the separation point to stall conditions, whereby when the second unit is actuated and the first unit is unactuated the airfoil will be kept at a maximum safe angle of attack.

19. An airplane instrument for installation on a leading edge of an airfoil in a region of influence of the shifting separation point, said instrument including mounting means, at least a first and a second sensing unit each of which is actuated upon the passage of the separation point over a different preselected point on the nose of the airfoil as the angle of attack of the airfoil varies, means to secure said units to said mounting means with the preselected point for the first unit to be slightly aft of the preselected point for the second unit, said first unit being so disposed that the preselected point for that unit corresponds to the approach of the separation point to stall conditions, a first switch controlled by the first unit, and a second switch controlled by the second unit, whereby when the second switch is actuated and the first switch is unactuated the airfoil will be at a maximum safe angle of attack.

20. An airplane instrument for installation on a leading edge of an airfoil in a region of influence of the shifting separation point, said instrument including mounting means, at least a first and a second sensing unit each of which is actuated upon the passage of the separation point over a different preselected point on the nose of the airfoil as the angle of attack of the airfoil varies, means to secure said units to said mounting means with the preselected point for the first unit to be slightly aft of the preselected point for the second unit, a first switch controlled by the first unit, a second switch controlled by the second unit, and electric signalling means variously actuated upon operation of said switches, whereby when the signalling means is actuated by the second switch and is unactuated by the first switch the airfoil will be at a maximum safe angle of attack.

LEONARD M. GREENE.

REFERENCES CITED

The following references are of record in the file of this patent:

UNITED STATES PATENTS

| Number | Name | Date |
| --- | --- | --- |
| 2,193,077 | Saxman | Mar. 12, 1940 |
| 2,296,528 | Lacoe | Sept. 22, 1942 |
| 2,328,384 | Lacoe | Aug. 31, 1943 |
| 2,478,967 | Greene | Aug. 16, 1949 |
| 2,486,779 | Fairbanks | Nov. 1, 1949 |

FOREIGN PATENTS

| Number | Country | Date |
| --- | --- | --- |
| 330,004 | Germany | Dec. 3, 1920 |